(12) United States Patent
Sakamoto

(10) Patent No.: US 9,785,085 B2
(45) Date of Patent: Oct. 10, 2017

(54) LASER SCANNING UNIT, IMAGE FORMING APPARATUS, LASER SCANNING METHOD

(71) Applicant: KYOCERA Document Solutions Inc., Osaka-shi, Osaka (JP)

(72) Inventor: Yasuaki Sakamoto, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/195,805

(22) Filed: Jun. 28, 2016

(65) Prior Publication Data

US 2016/0378017 A1    Dec. 29, 2016

(30) Foreign Application Priority Data

Jun. 29, 2015   (JP) .................................. 2015-129679

(51) Int. Cl.
| | | |
|---|---|---|
| *G03G 15/00* | (2006.01) | |
| *G03G 15/043* | (2006.01) | |
| *G02B 26/12* | (2006.01) | |

(52) U.S. Cl.
CPC ......... *G03G 15/043* (2013.01); *G02B 26/123* (2013.01); *G02B 26/127* (2013.01)

(58) Field of Classification Search
CPC ... G03G 15/043; G03G 26/123; G03G 26/127
USPC .......................................................... 399/4
See application file for complete search history.

(56) References Cited

U.S. PATENT DOCUMENTS

| | | | | |
|---|---|---|---|---|
| 6,493,010 | B1 * | 12/2002 | Takahashi | ................ B41J 2/473 347/116 |
| 2001/0026308 | A1 * | 10/2001 | Takahashi | .............. H04N 1/506 347/116 |
| 2001/0028387 | A1 * | 10/2001 | Maeda | ................. G02B 26/127 347/232 |
| 2010/0189453 | A1 * | 7/2010 | Ogasahara | ......... G03G 15/0435 399/51 |
| 2010/0226672 | A1 * | 9/2010 | Ogasahara | ......... G03G 15/0435 399/51 |
| 2010/0296822 | A1 * | 11/2010 | Takada | ............... G03G 15/0131 399/9 |

FOREIGN PATENT DOCUMENTS

| | | | | |
|---|---|---|---|---|
| JP | EP 0250132 | A2 * | 12/1987 | ............. H04N 1/053 |
| JP | 2004009349 | A | 1/2004 | |
| JP | 2005074941 | A * | 3/2005 | |

* cited by examiner

*Primary Examiner* — Susan Lee
(74) *Attorney, Agent, or Firm* — Alleman Hall Creasman & Tuttle LLP

(57) ABSTRACT

A laser scanning unit includes a first light source, a second light source, a scanning portion, a light detection portion, a timing control portion, and a light source control portion. The scanning portion is configured to cause light emitted from the first light source and the second light source to be scanned. The light detection portion is configured to detect the light that is scanned by the scanning portion. The timing control portion is configured to control a timing of writing an electrostatic latent image according to a timing of light detection by the light detection portion. The light source control portion is configured to: cause the light detected by the light detection portion to be emitted from the first light source in the first mode; and cause the light detected by the light detection portion to be emitted from the second light source in the second mode.

10 Claims, 4 Drawing Sheets

LASER SCANNING UNIT, IMAGE FORMING APPARATUS, LASER SCANNING METHOD

INCORPORATION BY REFERENCE

This application is based upon and claims the benefit of priority from the corresponding Japanese Patent Application No. 2015-129679 filed on Jun. 29, 2015, the entire contents of which are incorporated herein by reference.

BACKGROUND

The present disclosure relates to an electrophotographic image forming apparatus, a laser scanning unit mounted in the image forming apparatus, and a laser scanning method.

In an image forming apparatus, such as a printer, that is capable of forming an image by electrophotography, the light emitted from a light source based on image data is scanned onto an image carrier such as a photosensitive drum by a scanning portion such as a polygon mirror, and an electrostatic latent image corresponding to the image data is formed on the image carrier. In an image forming apparatus of this kind, the light emission timing corresponding to each line of the image data, i.e., the timing of writing an electrostatic latent image, is determined based on the timing of light detection by a light detection portion capable of detecting the light from the light source scanned by the scanning portion.

Meanwhile, an image forming apparatus is known in which the light beams emitted from a plurality of light sources corresponding to a plurality of image carriers are scanned by one scanning portion. In an image forming apparatus of this kind, the timing of writing an electrostatic latent image in each of a color printing mode in which a color image is formed and a monochrome printing mode in which a monochrome image is formed is determined based on the timing of light detection by a light detection portion that is provided so as to correspond to one of the plurality of light sources.

SUMMARY

A laser scanning unit according to one aspect of the present disclosure includes a first light source, a second light source, a scanning portion, a light detection portion, a timing control portion, and a light source control portion. The first light source is configured to be used to form an electrostatic latent image in a first mode. The second light source is configured to be used to form an electrostatic latent image in a second mode. The scanning portion is configured to cause light emitted from the first light source and the second light source to be scanned. The light detection portion is configured to detect, at a predetermined position, the light from the first light source and the light from the second light source that are scanned by the scanning portion. The timing control portion is configured to control a timing of writing an electrostatic latent image according to a timing of light detection by the light detection portion. The light source control portion is configured to: cause the light detected by the light detection portion to be emitted from the first light source in the first mode; and cause the light detected by the light detection portion to be emitted from the second light source in the second mode.

An image forming apparatus according to another aspect of the present disclosure includes: the above-described laser scanning unit; and an image forming portion configured to develop an electrostatic latent image formed by the laser scanning unit and transfer the electrostatic latent image onto a sheet.

A laser scanning method according to yet another aspect of the present disclosure is performed in a laser scanning unit including: a first light source configured to be used to form an electrostatic latent image in a first mode; a second light source configured to be used to form an electrostatic latent image in a second mode; a scanning portion configured to cause light emitted from the first light source and the second light source to be scanned; and a light detection portion configured to detect, at a predetermined position, the light from the first light source and the light from the second light source that are scanned by the scanning portion, and the method includes a first step and a second step described below. The first step controls a timing of writing an electrostatic latent image according to a timing of light detection by the light detection portion. The second step causes the light detected by the light detection portion to be emitted from the first light source in the first mode, and causing the light detected by the light detection portion to be emitted from the second light source in the second mode.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the accompanying drawings to facilitate understanding of the present disclosure. It should be appreciated that the embodiments described below represent an exemplary implementation of the present disclosure, and are not intended to limit the technical scope of the present disclosure.

[Schematic Configuration of Image Forming Apparatus 10]

First, a schematic configuration of an image forming apparatus 10 according to an embodiment of the present disclosure will be described with reference to FIGS. 1 and 2. Here, FIG. 1 is a schematic cross-sectional view showing a configuration of the image forming apparatus 10.

Figure 1:
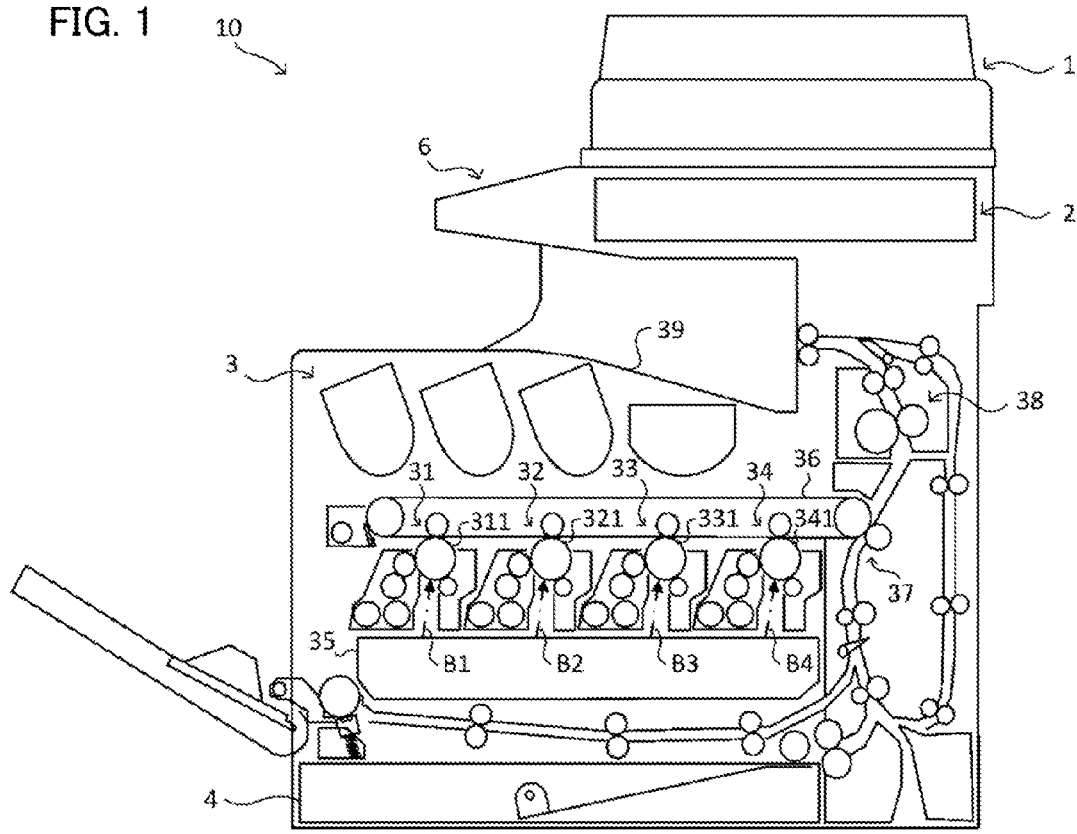
FIG. 1 is a diagram showing a configuration of an image forming apparatus according to an embodiment of the present disclosure.
Figure 2:
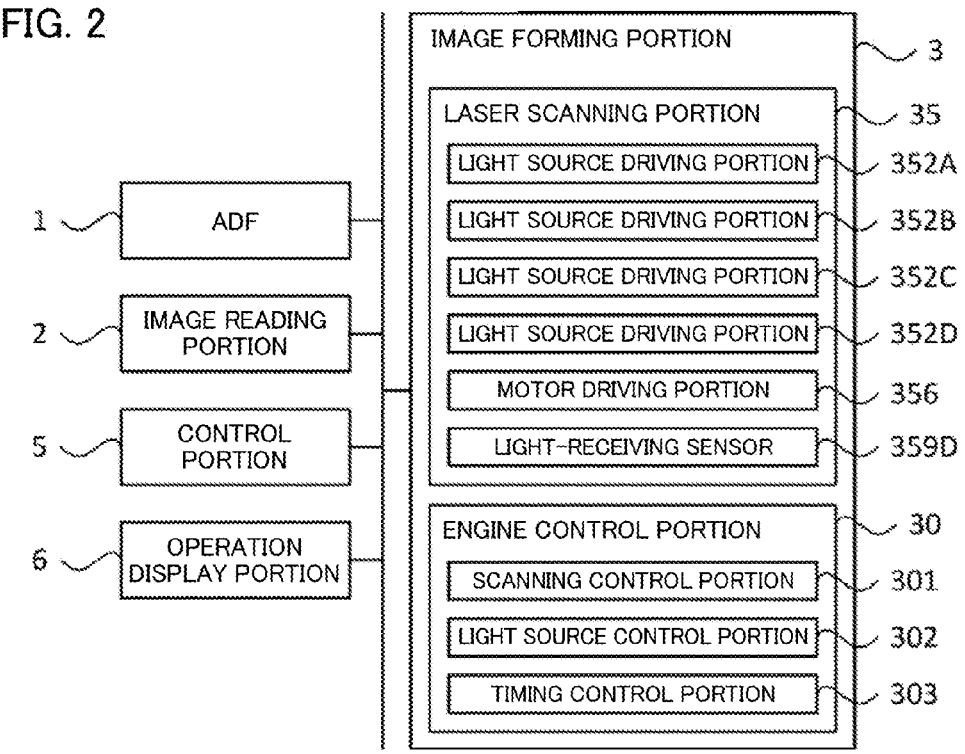
FIG. 2 is a block diagram showing a system configuration of the image forming apparatus according to an embodiment of the present disclosure.

As shown in FIGS. 1 and 2, the image forming apparatus 10 includes an ADF 1, an image reading portion 2, an image forming portion 3, a sheet feed portion 4, a control portion 5, and an operation display portion 6. The image forming apparatus 10 is a multifunction peripheral having a print function for forming an image based on image data, as well as a plurality of functions such as a scan function, a facsimile function, and a copy function. The present disclosure is applicable to an image forming apparatus such as a printer apparatus, a facsimile apparatus, and a copying machine.

The ADF 1 is an automatic document feeder that includes a document setting portion, a plurality of conveying rollers, a document sheet holding portion, and a sheet discharge portion, which are not shown, and conveys a document that is read by the image reading portion 2. The image reading portion 2 includes a document table, a light source, a plurality of mirrors, an optical lens, and a Charge Coupled Device (CCD), which are not shown, and is capable of executing an image reading process for reading image data from a document placed on the document table or a document conveyed by the ADF 1.

The control portion 5 includes control devices such as a CPU, a ROM, and a RAM, which are not shown. The CPU is a processor that executes various calculation processes. The ROM is a non-volatile storage portion in which information such as control programs for causing the CPU to execute various processes is stored in advance. The RAM is a volatile storage portion that is used as a temporary storage memory (work area) for the various processes executed by the CPU. In the control portion 5, the various control programs stored in advance in the ROM are executed by the CPU. Thus, overall control of the image forming apparatus 10 is performed by the control portion 5. It should be noted that the control portion 5 may be configured by an electronic circuit such as an integrated circuit (ASIC), or may be a control portion provided separately from a main control portion that performs centralized control of the image forming apparatus 10.

The operation display portion 6 includes a display portion such as a liquid crystal display that displays various types of information in accordance with a control instruction from the control portion 5 and an operation portion such as an operation key or a touch panel through which various types of information are input to the control portion 5 in accordance with a user operation.

The image forming portion 3 is capable of executing an image forming process (printing process) for forming an image by electrophotography, based on image data read by the image reading portion 2. The image forming portion 3 is also capable of executing the printing process, based on image data that is input from an information processing apparatus such as an external personal computer.

Specifically, as shown in FIGS. 1 and 2, the image forming portion 3 includes a plurality of image forming units 31 to 34, a laser scanning portion 35, an intermediate transfer belt 36, a secondary transfer roller 37, a fixing device 38, a sheet discharge tray 39, and an engine control portion 30. The image forming unit 31 includes a photosensitive drum 311 that carries a cyan (C) toner image. The image forming unit 32 includes a photosensitive drum 321 that carries a magenta (M) toner image. The image forming unit 33 includes a photosensitive drum 331 that carries a yellow (Y) toner image. The image forming unit 34 includes a photosensitive drum 341 that carries a black (K) toner image. Then, each of the image forming units 31 to 34 includes a charging device, a developing device, a primary transfer roller, a cleaning device, and so forth.

The laser scanning portion 35 applies laser light beams based on image data to each of the photosensitive drums of the image forming units 31 to 34 to form an electrostatic latent image based on the image data, on each of the photosensitive drums. The electrostatic latent images formed on the photosensitive drums by the laser scanning portion 35 are developed by the developing devices. Then, the toner images of the respective colors that have been developed on the photosensitive drums of the image forming units 31 to 34 by the developing devices are intermediately transferred onto the intermediate transfer belt 36, and subsequently transferred by the secondary transfer roller 37 onto a sheet fed by the sheet feed portion 4. Thereafter, the toner images that have been transferred onto the sheet are fused and fixed by the fixing device 38 to form a color image on the sheet, and the sheet is discharged to the sheet discharge tray 39. The sheet is a sheet material such as paper, coated paper, postcards, envelopes, and OHP sheets.

The engine control portion 30 controls the operations of the constituent elements of the image forming portion 3 to cause the image forming portion 3 to execute the printing process. For example, the engine control portion 30 is configured by an electronic circuit such as an integrated circuit (ASIC, DSP). In the image forming apparatus 10, the CPU of the control portion 5 may function as the engine control portion 30 by executing the control programs stored in the ROM.

Here, in the image forming apparatus 10, the printing process is executed in one of a monochrome printing mode (first mode) in which a monochrome image is formed and a color printing mode (second mode) in which a color image is formed. For example, in the monochrome printing mode, the printing process is executed by using the image forming unit 34. On the other hand, in the color printing mode, the printing process is executed by using the image forming units 31 to 34. In addition, in the image forming apparatus 10, the printing speed in the monochrome printing mode is set to be faster than the printing speed in the color printing mode.

For example, when an operation to execute the printing process is performed on the operation display portion 6, the control portion 5 instructs the engine control portion 30 to execute the printing process in the printing mode that is initially preset or the printing mode that is set by a user operation. When an instruction to execute the printing process is received from an external information processing apparatus, the control portion 5 instructs the engine control portion 30 to execute the printing process in the printing mode specified in the execution instruction.

On the other hand, when the engine control portion 30 is instructed to execute the printing process in the monochrome printing mode by the control portion 5, the engine control portion 30 executes the printing process by rotating the photosensitive drum 341 of the image forming unit 34 at a preset first printing speed. When the engine control portion 30 is instructed to execute the printing process in the color printing mode by the control portion 5, the engine control portion 30 executes the printing process by rotating the photosensitive drums 311 to 341 of the image forming units 31 to 34 at a second printing speed that is slower than the first printing speed.

Figure 3:
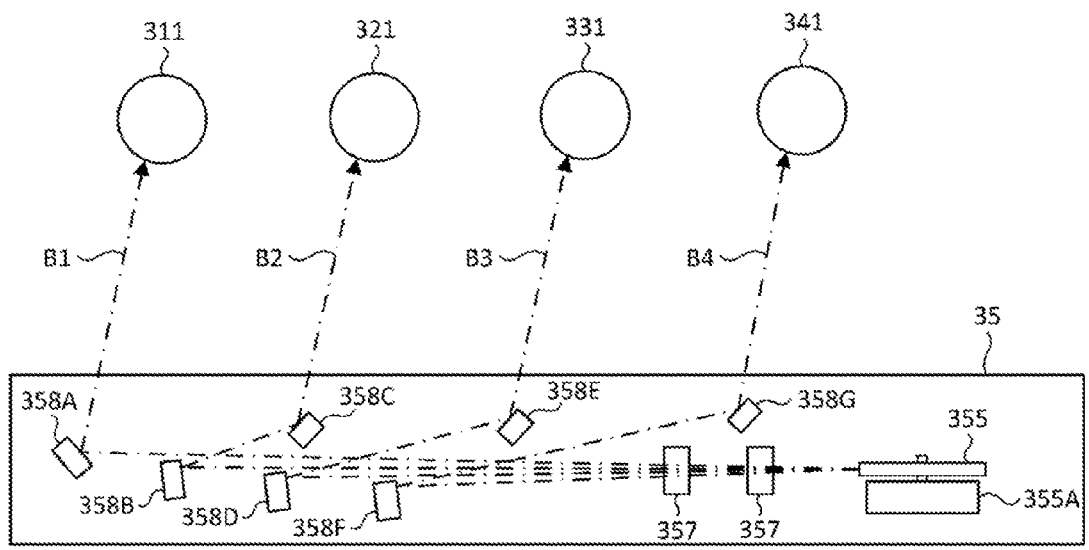
FIG. 3 is a diagram showing a configuration of a laser scanning portion of the image forming apparatus according to an embodiment of the present disclosure.
Figure 4:
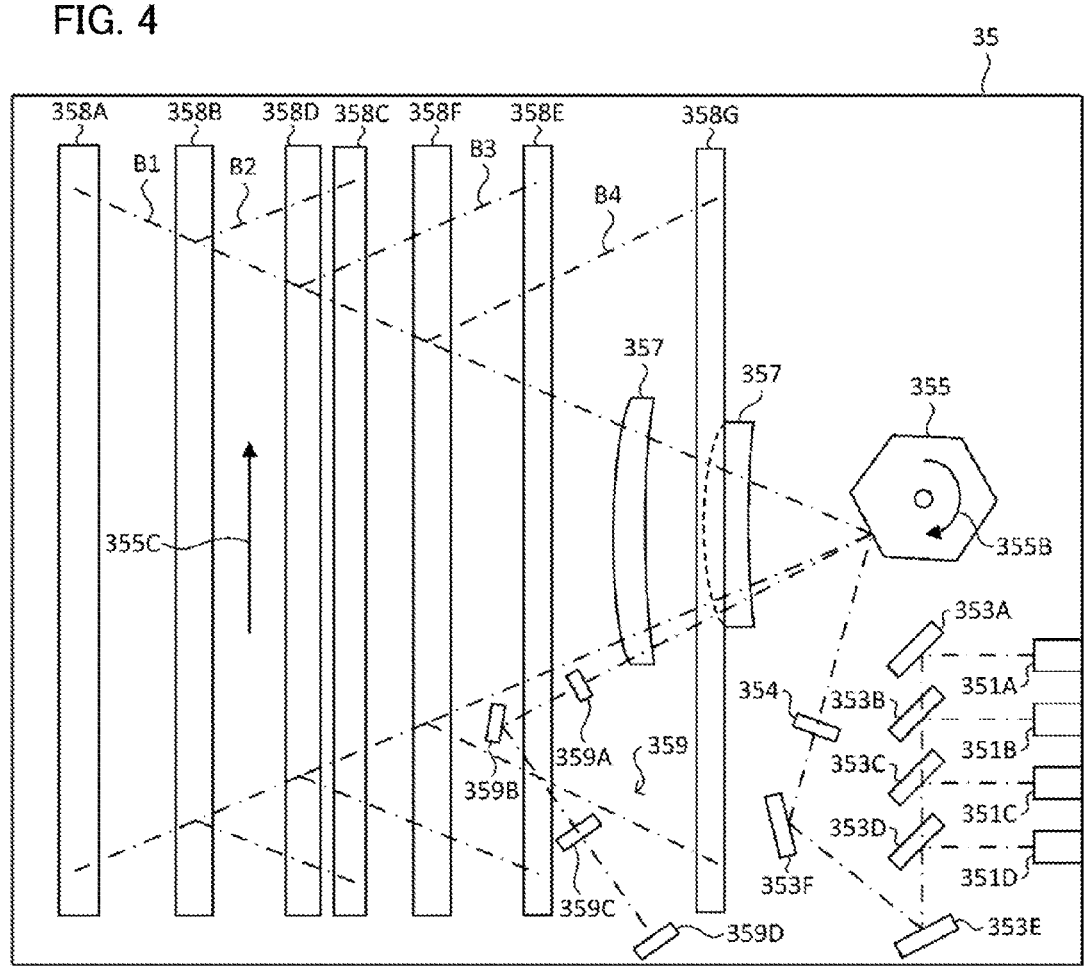
FIG. 4 is a diagram showing a configuration of the laser scanning portion of the image forming apparatus according to an embodiment of the present disclosure.
Figure 5:
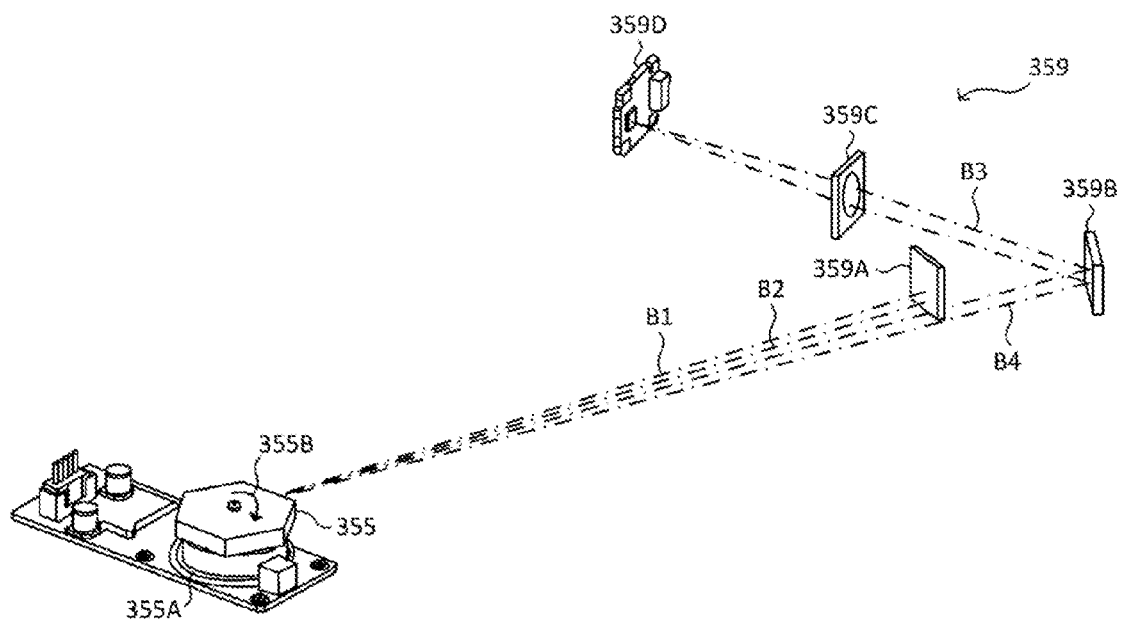
FIG. 5 is a diagram showing a configuration of a light detection portion of the image forming apparatus according to an embodiment of the present disclosure.

Next, the laser scanning portion 35 will be described in detail with reference to FIGS. 2 to 5. Here, FIG. 3 is a schematic cross-sectional view showing a configuration of the laser scanning portion 35. FIG. 4 is a schematic plan view showing the configuration of the laser scanning portion 35. FIG. 5 is a schematic perspective view showing a configuration of a light detection portion 359. In FIGS. 1 and 3 to 5, laser light beams B1 to B4 emitted from light sources 351A to 351D are indicated by dashed dotted lines.

As shown in FIGS. 2 to 5, the laser scanning portion 35 includes a plurality of light sources 351A to 351D, a plurality of light source driving portions 352A to 352D, a plurality of mirrors 353A to 353F, a cylindrical lens 354, a polygon mirror 355, a polygon motor 355A, a motor driving portion 356, an fθ lens 357, a plurality of mirrors 358A to 358G, and a light detection portion 359.

The plurality of light sources 351A to 351D are light sources such as laser diodes that emit light beams corresponding to image data. For example, as shown in FIGS. 3 and 4, in the image forming apparatus 10, the laser light beam B1 emitted from the light source 351A is applied onto the photosensitive drum 311, and the laser light beam B2 emitted from the light source 351B is applied onto the photosensitive drum 321. The laser light beam B3 emitted from the light source 351C is applied onto the photosensitive drum 331, and the laser light beam B4 emitted from the light source 351D is applied onto the photosensitive drum 341.

That is, when the printing process is executed in the monochrome printing mode in the image forming apparatus 10, the light source 351D is used to form an electrostatic latent image. When the printing process is executed in the color printing mode in the image forming apparatus 10, the light sources 351A to 351D are used to form electrostatic latent images. Here, the light source 351D used in the monochrome printing mode is an example of the first light source according to the present disclosure. The light source 351C among the light sources 351A to 351D used in the color printing mode is an example of the second light source according to the present disclosure.

The plurality of light source driving portions 352A to 352D are drive circuits that drive the plurality of light sources 351A to 351D. For example, the light source driving portion 352A drives the light source 351A, based on a pulse signal modulated based on cyan image data that is input from the engine control portion 30. The light source driving portion 352B drives the light source 351B, based on a pulse signal modulated based on magenta image data that is input from the engine control portion 30. The light source driving portion 352C drives the light source 351C, based on a pulse signal modulated based on yellow image data that is input from the engine control portion 30. The light source driving portion 352D drives the light source 351D, based on a pulse signal modulated based on black image data that is input from the engine control portion 30.

As shown in FIG. 4, the plurality of mirrors 353A to 353F cause the light beams emitted from the plurality of light sources 351A to 351D to be reflected by the polygon mirror 355. For example, in the image forming apparatus 10, the plurality of light sources 351A to 351D are disposed at different positions in the direction of the rotational axis of the polygon mirror 355 (the direction orthogonal to the plane of paper in FIG. 4). Then, the light beams emitted from the plurality of light sources 351A to 351D are reflected by the mirror 353E via the plurality of mirrors 353A to 353D provided so as to correspond to the plurality of light sources 351A to 351D. The mirror 353E and the mirror 353F cause the laser light beams B1 to B4 reflected by the mirror 353A to 353D to be reflected by the polygon mirror 355. The cylindrical lens 354 causes the laser light beams B1 to B4 that have been reflected by the mirror 353F and applied to the polygon mirror 355 to be converged in the rotational axis direction.

The polygon mirror 355 causes the laser light beams B1 to B4 emitted from the plurality of light sources 351A to 351D to be scanned. For example, as shown in FIG. 4, the polygon mirror 355 has a regular hexagonal shape in plan view and has six reflective surfaces along a rotational direction 355B. The polygon mirror 355 is rotated along the rotational direction 355B by a driving force supplied from the polygon motor 355A. Accordingly, the laser light beams B1 to B4 that have been emitted from the plurality of light sources 351A to 351D and reflected by the reflective surfaces are scanned along a scanning direction 355C. Here, the polygon mirror 355 is an example of the scanning portion according to the present disclosure.

The motor driving portion 356 is a drive circuit that drives the polygon motor 355A. Specifically, the motor driving portion 356 causes the polygon motor 355A to rotate at a constant speed in response to a control signal input from the engine control portion 30. For example, the motor driving portion 356 controls the rotation speed of the polygon motor 355A, based on a detection signal output from an encoder (not shown) that detects the number of rotations of the polygon motor 355A.

The fθ lens 357 causes the laser light beams B1 to B4 reflected by the polygon mirror 355 to be scanned at a uniform speed on the surfaces of the photosensitive drums 311 to 341, respectively. As shown in FIGS. 3 and 4, the plurality of mirrors 358A to 358G cause the laser light beams B1 to B4 that have transmitted through the fθ lens 357 to be reflected by the photosensitive drums 311 to 341. Specifically, the mirror 358A causes the laser light beam B1 to be reflected by the photosensitive drum 311, the mirrors 358B and the mirror 358C cause the laser light beam B2 to be reflected by the photosensitive drum 321. The mirror 358D and the mirror 358E cause the laser light beam B3 to be reflected by the photosensitive drum 331, and the mirror 358F and the mirror 358G cause the laser light beam B4 to be reflected by the photosensitive drum 341.

The light detection portion 359 is capable of detecting, at a predetermined position, the laser light beams B3 and B4 scanned by the polygon mirror 355. For example, the light detection portion 359 is capable of detecting the laser light beams B3 and B4 at a position on a part of the light scanning path of the polygon mirror 355 that is located on the upstream side, in the scanning direction 355C, from the writing positions of the electrostatic latent images on the photosensitive drums.

Specifically, as shown in FIGS. 2, 4, and 5, the light detection portion 359 includes a shielding member 359A, a mirror 359B, a converging lens 359C, and a light-receiving sensor 359D.

The shielding member 359A, the mirror 359B, and the converging lens 359C guide the laser light beams B3 to B4 scanned by the polygon mirror 355 to the light-receiving sensor 359D. Specifically, as shown in FIG. 5, the shielding member 359A shields the laser light beams B1 and B2 among the laser light beams B1 to B4 scanned by the polygon mirror 355.

It should be noted that the shielding member 359A may shield the laser light beams B2 and B3. In this case, the light source 351A, which emits the laser light beam B1 that is not shielded by the shielding member 359A, is another example of the second light source according to the present disclosure. Alternatively, the shielding member 359A may shield the laser light beam B1 and the laser light beam B3. In this case, the light source 351B, which emits the laser light beam B2 that is not shielded by the shielding member 359A, is another example of the second light source according to the present disclosure.

The mirror 359B causes the laser light beams B3 and B4 that have passed through the arrangement position of the shielding member 359A to be reflected by the light-receiving sensor 359D. The converging lens 359C causes the laser light beams B3 and B4 that have been reflected by the mirror 359B and applied to the light-receiving sensor 359D to be converged on a light receiving surface of the light-receiving sensor 359D. Here, the shielding member 359A, the mirror 359B, and the converging lens 359C are an example of the optical system member according to the present disclosure. The converging lens 359C is an example of a converging member according to the present disclosure.

The light-receiving sensor 359D is capable of receiving the laser light beam B3 emitted from the light source 351C and the laser light beam B4 emitted from the light source 351D. For example, the light-receiving sensor 359D is a photodiode that outputs an electric signal when the amount of light received on the light receiving surface exceeds a preset threshold. The electric signal output from the light-receiving sensor 359D is input to the engine control portion 30, and used to determine the timing of writing an electrostatic latent image onto each of the photosensitive drums. As another embodiment, a configuration is possible in which a plurality of light-receiving sensors 359D are provided so as to correspond to the plurality of light sources 351A to 351D.

Meanwhile, like the image forming apparatus 10, there is known an image forming apparatus in which light beams emitted from the plurality of light sources 351A to 351D corresponding to the plurality of photosensitive drums 311 to 341 are scanned by one polygon mirror 355. In an image forming apparatus of this kind, the timing of writing an electrostatic latent image in each of the color printing mode and the monochrome printing mode is determined based on the timing of light detection by the light-receiving sensor 359D that is provided so as to correspond to one of the plurality of light sources 351A to 351D.

However, when the light beams detected by the light-receiving sensor 359D in each of the color printing mode and the monochrome printing mode are always applied by the same light source, that light source may deteriorate earlier than the other light sources. For example, when only the light source corresponding to the light-receiving sensor 359D is turned on at the timing of light detection by the light-receiving sensor 359D and the other light sources are not turned on, the light source corresponding to the light-receiving sensor 359D will deteriorate earlier than the other light sources. In this respect, the image forming apparatus 10 according to an embodiment of the present disclosure is capable of suppressing a non-uniform deterioration of the plurality of light sources as will be described below.

Specifically, as shown in FIG. 2, in the image forming apparatus 10, the engine control portion 30 includes a scanning control portion 301, a light source control portion 302, and a timing control portion 303. Here, the configuration including the laser scanning portion 35 and the engine control portion 30 is an example of a laser scanning unit according to the present disclosure.

The scanning control portion 301 sets the speed of light scanning by the polygon mirror 355 to one of a predetermined first speed and a predetermined second speed that is slower than the first speed, in accordance with the printing mode. Specifically, the scanning control portion 301 sets the speed of light scanning by the polygon mirror 355 to the first speed corresponding to the first printing speed when the printing mode is set to the monochrome printing mode. The scanning control portion 301 sets the speed of light scanning by the polygon mirror 355 to the second speed corresponding to the second printing speed when the printing mode is set to the color printing mode.

The light source control portion 302 causes the light beam detected by the light-receiving sensor 359D to be emitted from the light source 351D in the monochrome printing mode, and causes the light beam detected by the light-receiving sensor 359D to be emitted from the light source 351C in the color printing mode.

Meanwhile, in the image forming apparatus 10, the speed of light scanning by the polygon mirror 355 is set to one of the first speed and the second speed in accordance with the printing mode. Here, when the same amount of light beams is emitted, in the monochrome printing mode and the color printing mode, from the light sources that emit the light beams to be detected by the light-receiving sensor 359D, there is a possibility that the amount of light received on the light receiving surface of the light-receiving sensor 359D may be insufficient or excessive in one of the printing modes, and the timing of writing an electrostatic latent image onto the photosensitive drums may be varied.

Accordingly, the light source control portion 302 causes the light source 351D to emit light in a preset first light amount when the light beam detected by the light-receiving sensor 359D is emitted from the light source 351D, and causes the light source 351C to emit light in a preset second light amount that is less than the first light amount when the light beam detected by the light-receiving sensor 359D is emitted from the light source 351C.

For example, the engine control portion 30 transmits a control signal to each of the light source driving portions 352A to 352D at the time of turning on the image forming apparatus 10, to set the amount of light emitted from the light source 351D to the first light amount and set the amount of light emitted from the light sources 351A to 351C to the second light amount. It should be noted that a set value indicating the first light amount or the second light amount may be stored in advance in the non-volatile memory included in each of the light source driving portions 352A to 352D.

The timing control portion 303 controls the timing of writing an electrostatic latent image according to the timing of light detection by the light-receiving sensor 359D. Specifically, when the printing process is executed in the monochrome printing mode, the timing control portion 303 controls the timing of writing an electrostatic latent image onto the photosensitive drum 341 according to the timing of detection, by the light-receiving sensor 359D, of the laser light beam B4 emitted from the light source 351D. When the printing process is executed in the color printing mode, the timing control portion 303 controls the timing of writing an electrostatic latent image onto each of the photosensitive drums 311 to 341 according to the timing of detection, by the light-receiving sensor 359D, of the laser light beam B3 emitted from the light source 351C.

[Laser Scanning Process]

Figure 6:
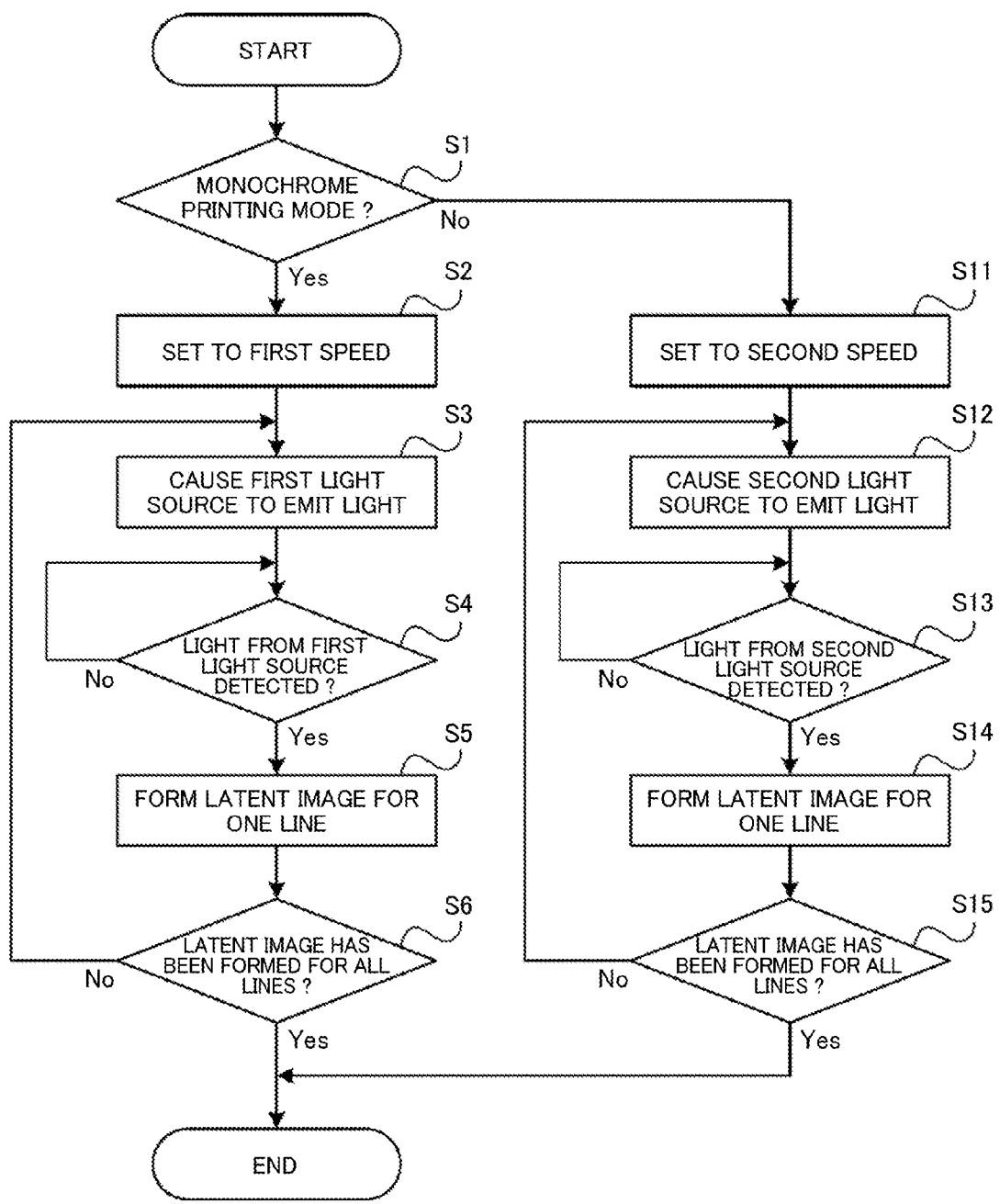
FIG. 6 is a flowchart illustrating an example of a laser scanning process executed in the image forming apparatus according to an embodiment of the present disclosure.

In the following, a laser scanning method according to the present disclosure will be described with reference to FIG. 6, along with an example of the procedure of a laser scanning process executed by the engine control portion 30 in the image forming apparatus 10. Here, Steps S1, S2 . . . represent step numbers in the processing procedure executed by the engine control portion 30. It should be noted that the engine control portion 30 executes the laser scanning process when the printing process is executed. As another embodiment, a configuration is also possible in which the control portion 5 executes the laser scanning process.

<Step S1>

First, at step S1, the engine control portion 30 determines whether the printing mode is set to the monochrome printing mode.

Here, if the engine control portion 30 determines that the printing mode is set to the monochrome printing mode (Yes at S1), the engine control portion 30 causes the process to proceed to step S2. If the printing mode is not set to the monochrome printing mode (No at S1), the engine control portion 30 causes the process to proceed to step S11.

<Step S2>

At step S2, the engine control portion 30 sets the speed of light scanning by the polygon mirror 355 to the first speed. Specifically, the engine control portion 30 causes the motor driving portion 356 to rotate the polygon motor 355A at the first speed. Here, the process of step S2 is executed by the scanning control portion 301 of the engine control portion 30.

<Step S3>

At step S3, the engine control portion 30 causes the light source 351D (first light source) to emit light to cause the light in the first light amount to be emitted from the light source 351D. For example, the engine control portion 30 causes the light source driving portion 352D to execute an Automatic Power Control (APC) process in which the amount of light emitted from the light source 351D is adjusted to the first light amount, and causes the light in the first light amount to be emitted from the light source 351D. In addition, the engine control portion 30 turns off the light sources 351A to 351C while the light source 351D is turned on. Here, the process of step S3 is an example of the second step according to the present disclosure, and is executed by the light source control portion 302 of the engine control portion 30.

<Step S4>

At step S4, the engine control portion 30 determines whether the light beam emitted from the light source 351D has been detected by the light-receiving sensor 359D. Specifically, the engine control portion 30 determines that the light beam emitted from the light source 351D has been detected by the light-receiving sensor 359D when the electric signal is input from the light-receiving sensor 359D.

Here, if the engine control portion 30 determines that the light beam emitted from the light source 351D has been detected by the light-receiving sensor 359D (Yes at S4), the engine control portion 30 causes the process to proceed to step S5. If the light beam emitted from the light source 351D has not been detected by the light-receiving sensor 359D (No at S4), the engine control portion 30 waits at step S4 for the light beam emitted from the light source 351D to be detected by the light-receiving sensor 359D.

<Step S5>

At step S5, the engine control portion 30 determines the timing of writing an electrostatic latent image, based on the timing of detection, by the light-receiving sensor 359D, of the light beam emitted from the light source 351D at step S4, and forms an electrostatic latent image for one line on the photosensitive drum 341, based on the writing timing. Here, the process of step S5 is an example of the first step according to the present disclosure, and is executed by the timing control portion 303 of the engine control portion 30.

Specifically, the engine control portion 30 inputs a pulse signal modulated based on image data to the light source driving portion 352D in synchronization with the writing timing, and causes the light source driving portion 352D to drive the light source 351D.

<Step S6>

At step S6, the engine control portion 30 determines whether an electrostatic latent image has been formed for all lines of the image data to be printed in the printing process.

Here, if the engine control portion 30 determines that an electrostatic latent images has been formed for all lines of the image data to be printed in the printing process (Yes at S6), the engine control portion 30 ends the laser scanning process. If an electrostatic latent image has not been formed for all lines of the image data to be printed in the printing process (No at S6), the engine control portion 30 causes the process to proceed to step S3, and executes the processes from step S3 to step S5 until an electrostatic latent image is formed for all lines.

<Step S11>

On the other hand, if it is determined at step S1 that the printing mode is not set to the monochrome printing mode, the engine control portion 30 executes the process of step S11. At step S11, the engine control portion 30 sets the speed of light scanning by the polygon mirror 355 to the second speed. Specifically, the engine control portion 30 causes the motor driving portion 356 to rotate the polygon motor 355A at the second speed. Here, the process of step S11 is executed by the scanning control portion 301 of the engine control portion 30.

<Step S12>

At step S12, the engine control portion 30 causes the light source 351C (second light source) to emit light to cause the light in the second light amount to be emitted from the light source 351C. For example, the engine control portion 30 causes the light source driving portion 352C to execute the APC process in which the amount of light emitted from the light source 351C is adjusted to the second light amount, and causes the light in the second light amount to be emitted from the light source 351C. In addition, the engine control portion 30 turns on the light source 351A and the light source 351B and turns off the light source 351D while the light source 351C is turned on. It should be noted that the engine control portion 30 may turn off the light source 351A, the light source 351B, and the light source 351D while the light source 351C is turned on. In this case, the shielding member 359A may be omitted in the laser scanning portion 35. Here, the process of step S12 is an example of the second step according to the present disclosure, and is executed by the light source control portion 302 of the engine control portion 30.

It should be noted that the engine control portion 30 causes the light source driving portions 352A and 352B to execute, in parallel with the process of step S12, the APC process in which the amount of light emitted from the light sources 351A and 351B is adjusted to the second light amount, and causes the light source driving portion 352D to execute the APC process in which the amount of light emitted from the light source 351D is adjusted to the first light amount.

<Step S13>

At step S13, the engine control portion 30 determines whether the light beam emitted from the light source 351C has been detected by the light-receiving sensor 359D. Specifically, the engine control portion 30 determines that the light beam emitted from the light source 351C has been detected by the light-receiving sensor 359D when the electric signal is input from the light-receiving sensor 359D.

Here, if the engine control portion 30 determines that the light beam emitted from the light source 351C has been detected by the light-receiving sensor 359D (Yes at S13), the engine control portion 30 causes the process to proceed to step S14. If the light beam emitted from the light source 351C has not been detected by the light-receiving sensor 359D (No at S13), the engine control portion 30 waits at step S13 for the light beam emitted from the light source 351C to be detected by the light-receiving sensor 359D.

<Step S14>

At step S14, the engine control portion 30 determines the timing of writing an electrostatic latent image, based on the timing of detection, by the light-receiving sensor 359D, of the light beam emitted from the light source 351C at step S13, and forms an electrostatic latent image for one line on each of the photosensitive drums 311 to 341, based on the writing timing. This suppresses the occurrence of a color deviation in the printed image, as compared with a configuration in which the light source 351D corresponding to black, which does not overlap with the other colors in a color image, is used to determine the timing of writing an electrostatic latent image in the color printing mode. Here, the process of step S14 is an example of the first step according to the present disclosure, and is executed by the timing control portion 303 of the engine control portion 30.

Specifically, the engine control portion 30 inputs a pulse signal modulated based on image data to the light source driving portions 352A to 352D in synchronization with the writing timing, and causes the light source driving portions 352A to 352D to drive the light sources 351A to 351D. For the image data input to the light source driving portion 352D, the engine control portion 30 inputs the image data to the light source driving portion 352D after executing a density conversion process corresponding to the difference between the first light amount and the second light amount.

<Step S15>

At step S15, the engine control portion 30 determines whether an electrostatic latent image has been formed for all lines of the image data to be printed in the printing process.

Here, if the engine control portion 30 determines that an electrostatic latent image has been formed for all lines of the image data to be printed in the printing process (Yes at S15), the engine control portion 30 ends the laser scanning process. If an electrostatic latent image has not been formed for all lines of the image data to be printed in the printing process (No at S15), the engine control portion 30 causes the process to proceed to step S12, and executes the processes from step S12 to step S14 until an electrostatic latent image is formed for all lines.

In this manner, in the laser scanning process, the timing of writing an electrostatic latent image is determined based on the light beam emitted from the light source 351D when the printing mode is set to the monochrome printing mode, and the timing of writing an electrostatic latent image is determined based on the light beam emitted from the light source 351C when the printing mode is set to the color printing mode. This suppresses a non-uniform deterioration of the plurality of light sources 351A to 351D, as compared with a configuration in which the timing of writing an electrostatic latent image is determined based on the light beam emitted from the same light source in both the monochrome printing mode and the color printing mode.

In the laser scanning process, the light in the first light amount is applied to the light-receiving sensor 359D from the light source 351D when the printing mode is set to the monochrome printing mode, and the light in the second light amount is applied to the light-receiving sensor 359D from the light source 351C when the printing mode is set to the color printing mode. Accordingly, unlike a configuration in which light is emitted to the light-receiving sensor 359D from the same light source in both the monochrome printing mode and the color printing mode, it is not necessary to execute a process for changing the amount of light emitted from the light source according to the printing mode, thus making it possible to simplify the processing content.

Another Embodiment

As another embodiment, a configuration is conceivable in which the light source that emits the light beam detected by the light-receiving sensor 359D in the color printing mode is sequentially switched.

Specifically, in an image forming apparatus 10 according to said another embodiment, the light detection portion 359 does not include the shielding member 359A, and the light-receiving sensor 359D is capable of receiving the laser light beams B1 to B4 emitted from the light sources 351A to 351D. Here, the light sources 351A to 351C are an example of the plurality of second light sources according to the present disclosure.

In the image forming apparatus 10 according to said another embodiment, in the color printing mode, the light source control portion 302 sequentially switches, among the light sources 351A to 351C, the light source that emits light detected by the light-receiving sensor 359D.

For example, it is conceivable that the light source control portion 302 sequentially switches, among the light sources 351A to 351C, the light source that emits light detected by the light-receiving sensor 359D for every predetermined number of print pages. For example, the light source control portion 302 sequentially switches, among the light sources 351A to 351C, the light source that emits light detected by the light-receiving sensor 359D for each page. This makes it possible to further suppress a non-uniform deterioration of the plurality of light sources 351A to 351D.

Meanwhile, a change in the internal temperature of the laser scanning portion 35 may result in a change in the refractive index of the optical elements such as the fθ lens 357. Also, the wavelength of the light beam emitted from each of the light sources 351A to 351D may vary depending on the temperature of each of the light sources 351A to 351D. A change in the refractive index of the optical element or the wavelength of the light beam may cause a positional shift in the scanning direction 355C of the plurality of light beams respectively emitted from the light sources 351A to 351D and scanned by the polygon mirror 355, causing a color deviation in the printed color image.

In this respect, the image forming apparatus 10 according to said another embodiment, the timing control portion 303 corrects the timing of writing an electrostatic latent image by each of the light sources 351A to 351C, based on the timings of light detection by the light-receiving sensor 359D before and after switching, by the light source control portion 302, of the light source that emits the light beam detected by the light-receiving sensor 359D.

For example, when the light source that emits the light beam detected by the light-receiving sensor 359D is switched by the light source control portion 302, the timing control portion 303 corrects the timing of writing an electrostatic latent image by the light source before the switching is performed and/or the light source after the switching is performed, based on the difference between the timing of detection, by the light-receiving sensor 359D, of the light beam emitted from the light source before the switching is performed and the timing of detection, by the light-receiving sensor 359D, of the light beam emitted from the light source after the switching is performed. This suppresses the occurrence of a color deviation in a color image printed by the image forming apparatus 10.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A laser scanning unit comprising:
    a first light source configured to be used to form an electrostatic latent image in a first mode;
    a second light source configured to be used to form an electrostatic latent image in a second mode;
    a scanning portion configured to cause light emitted from the first light source and the second light source to be scanned;
    a light detection portion configured to detect, at a predetermined position, the light from the first light source and the light from the second light source that are scanned by the scanning portion;
    a timing control portion configured to control a timing of writing an electrostatic latent image according to a timing of light detection by the light detection portion; and
    a light source control portion configured to: cause the light detected by the light detection portion to be emitted from the first light source in the first mode; and cause the light detected by the light detection portion to be emitted from the second light source in the second mode.

2. The laser scanning unit according to claim 1, further comprising
    a scanning control portion configured to: set a speed of light scanning by the scanning portion to a predetermined first speed in the first mode; and set the speed of light scanning by the scanning portion to a predetermined second speed in the second mode, the second speed being slower than the first speed, wherein the light source control portion is configured to: cause the first light source to emit light in a preset first light amount when the light detected by the light detection portion is emitted from the first light source; and cause the second light source to emit light in a preset second light amount that is less than the first light amount when the light detected by the light detection portion is emitted from the second light source.

3. The laser scanning unit according to claim 1, wherein the light detection portion further includes: a light-receiving sensor configured to receive the light from the first light source and the light from the second light source; and an optical system member configured to guide, to the light-receiving sensor, the light from the first light source and the light from the second light source that are scanned by the scanning portion.

4. The laser scanning unit according to claim 3, wherein the optical system member includes a converging member configured to converge, onto a light receiving surface of the light-receiving sensor, the light from the first light source and the light from the second light source that are scanned by the scanning portion.

5. The laser scanning unit according to claim 1, wherein
    the second light source is one of a plurality of second light sources, and
    the light source control portion is configured to perform sequential switching between the second light sources to emit light that is to be detected by the light detection portion in the second mode.

6. The laser scanning unit according to claim 5, wherein the light source control portion is configured to perform switching between the second light sources for every predetermined number of print pages.

7. The laser scanning unit according to claim 5, wherein the timing control portion is configured to correct the timing of writing an electrostatic latent image by each of the second light sources, based on the timing of light detection by the light detection portion before and after the switching between the second light sources performed by the light source control portion.

8. The laser scanning unit according to claim 1, wherein the second light source is a light source corresponding to cyan, magenta, or yellow.

9. An image forming apparatus comprising:
    the laser scanning unit according to claim 1; and
    an image forming portion configured to develop an electrostatic latent image formed by the laser scanning unit and transfer the electrostatic latent image onto a sheet.

10. A laser scanning method performed in a laser scanning unit including:
    a first light source configured to be used to form an electrostatic latent image in a first mode; a second light source configured to be used to form an electrostatic latent image in a second mode; a scanning portion configured to cause light emitted from the first light source and the second light source to be scanned; and a light detection portion configured to detect, at a predetermined position, the light from the first light source and the light from the second light source that are scanned by the scanning portion, the method comprising:
    a first step of controlling a timing of writing an electrostatic latent image according to a timing of light detection by the light detection portion; and
    a second step of causing the light detected by the light detection portion to be emitted from the first light source in the first mode, and causing the light detected by the light detection portion to be emitted from the second light source in the second mode.

* * * * *